US012726154B2

(12) United States Patent
Kim et al.

(10) Patent No.: US 12,726,154 B2
(45) Date of Patent: Sep. 1, 2026

(54) ENERGY MANAGEMENT APPARATUS AND ENERGY MANAGEMENT METHOD

(71) Applicant: LG ELECTRONICS INC., Seoul (KR)

(72) Inventors: Jaehong Kim, Seoul (KR); Kamin Lee, Seoul (KR); Hongkyu Kim, Seoul (KR); Jihack Lee, Seoul (KR); Hyejeong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 18/672,846

(22) Filed: May 23, 2024

(65) Prior Publication Data

US 2024/0396498 A1 Nov. 28, 2024

(30) Foreign Application Priority Data

May 26, 2023 (KR) ........................ 10-2023-0068663

(51) Int. Cl.
*H02S 50/00* (2014.01)
*H02J 3/00* (2006.01)
(Continued)

(52) U.S. Cl.
CPC .............. *H02S 50/00* (2013.01); *H02J 3/003* (2020.01); *H02J 3/004* (2020.01); *H02J 3/381* (2013.01);
(Continued)

(58) Field of Classification Search
None
See application file for complete search history.

(56) References Cited

U.S. PATENT DOCUMENTS

2011/0184583 A1* 7/2011 El-Barbari .............. H02S 50/10 700/297
2016/0190984 A1* 6/2016 Caine ...................... H02S 50/00 702/60

(Continued)

FOREIGN PATENT DOCUMENTS

| | | |
|---|---|---|
| KR | 10-2018-0015506 | 2/2018 |
| KR | 10-2019-0007328 | 1/2019 |
| KR | 10-2020-0119371 | 10/2020 |

OTHER PUBLICATIONS

Korean Intellectual Property Office Application No. 10-2023-0068663, Office Action dated Jan. 16, 2026, 6 pages.

*Primary Examiner* — Jas A Sanghera
(74) *Attorney, Agent, or Firm* — LEE, HONG, DEGERMAN, KANG & WAIMEY

(57) ABSTRACT

Proposed are an energy management apparatus and an energy storage apparatus. The energy management apparatus includes an electricity generation amount forecast unit including an electricity generation amount forecast model, a consumption amount forecast unit including a consumption amount forecast model, and a control module configured to detect an abnormality of a solar panel based on a forecast electricity generation amount, which is forecasted on a per-time span basis, and on an actually generated electricity generation amount, wherein the control module corrects the forecast electricity generation amount based on the electricity generation amounts up to now and determines the presence or absence of the abnormality of the solar panel and the cause of a failure of the solar panel based on the corrected forecast electricity generation amount.

11 Claims, 7 Drawing Sheets

(51) Int. Cl.
*H02J 3/38* (2006.01)
*H02J 7/80* (2026.01)
*H02J 7/90* (2026.01)
*H02J 101/24* (2026.01)

(52) U.S. Cl.
CPC ................ *H02J 7/80* (2026.01); *H02J 7/971* (2026.01); *H02J 2101/24* (2026.01)

(56) References Cited

U.S. PATENT DOCUMENTS

2018/0196896 A1* 7/2018 Arai ..................... G01R 21/133
2021/0218261 A1* 7/2021 Kofman .............. H02J 7/00712
2021/0224903 A1* 7/2021 Mathiesen-Ohman ... H04L 9/50
2021/0281213 A1* 9/2021 Jones ............... G01R 19/16571

* cited by examiner (a)

(b)

(c)

- FORECAST VALUE OF ELECTRICITY GENERATION AMOUNT
- ACTUAL ELECTRICITY GENERATION AMOUNT
- WEATHER, ATMOSPHERE QUALITY
- EQUIPMENT INFORMATION OF ESS

⇨

⇨

- NORMALITY AND ABNORMALITY CATEGORIZATION
- CATEGORIZATION OF DETAIL OF ABNORMALITY
  - ABNORMALITY OF SOLAR PANEL ITSELF
  - ABNORMALITY DUE TO FOREIGN MATERIAL OR LIKE ON SOLAR PANEL

ENERGY MANAGEMENT APPARATUS AND ENERGY MANAGEMENT METHOD

CROSS-REFERENCE TO RELATED APPLICATION

Pursuant to 35 U.S.C. § 119 (a), this application claims the benefit of earlier filing date and right of priority to Korean Patent Application No. 10-2023-0068663, filed on May 26, 2023, the contents of which are hereby incorporated by reference herein in its entirety.

TECHNICAL FIELD

The present disclosure relates to an energy management apparatus and an energy management method, and more particularly, to an energy management apparatus and an energy management method that are capable of determining the presence or absence of an abnormality of a solar panel in an optimal manner.

BACKGROUND ART

Presently, South Korea's electricity billing rate varies depending on electricity usage applications, differing among households, general purpose, education, industrial, and other sectors. An increasing block rate pricing system, also known as a progressive rate system, applies to an electricity billing rate for the household sector.

The progressive rate system, which applies to the electricity billing rate for the household sector, presents persistent discriminatory problems in that high-income one-person households benefit from lower electricity bill rates than low-income multiple-person households and in that excessively higher billing rates apply to households with high electricity consumption than in other countries.

The energy storage apparatus, also known as an energy storage system (ESS), refers to a storage apparatus that stores electric power excessively generated in a power plant and transmits the stored electric power when the electric power supply is temporarily insufficient. The ESS is configured to include a battery that stores electricity, a power conditioning system (PCS) for efficiently managing the battery, an energy management system (EMS), a battery management system (BMS), and the like.

In the state of California in the U.S. and in other countries, there is a growing demand for new renewable energy. This demand stems from requirements mandating the installation of photovoltaics facilities or the like when constructing new houses. Accordingly, the energy storage apparatus (ESS) (or a battery) is installed within a house or building. The energy storage apparatus is supplied with new renewable energy and stores surplus electric power. Electric power for loads is supplied from the energy storage apparatus whenever necessary, and energy is efficiently consumed.

In addition, as described above, a system company generally implements a variable electricity billing rate in which the unit price of electric power usage, that is, a time of use (TOU) rate, varies across different time spans.

Accordingly, in order to economically use electric energy, it is necessary to distribute loads so that an electric power amount used during a time span with a high transfer rate is used during a time span with a low unit price of electric power usage.

In a case where a time span-based electricity billing rate, that is, the TOU rate, is not considered, when an electricity generation amount generated by an energy generator (including a new renewable energy generation apparatus) installed in each house exceeds a consumption amount, the energy storage apparatus is charged with surplus electric power, or the surplus electric power is sold to a system. Furthermore, when the consumption amount is larger than the electricity generation amount, the electricity generation amount is consumed for electric power for loads, and, when the electricity generation amount is insufficient, an additionally necessary electricity amount is supplied from the energy storage apparatus. When the electric power in the energy storage apparatus is used up, an additionally necessary electricity amount is received (purchased) from the system to supply the required electric power to the loads.

At this point, in order to minimize an electricity billing rate of energy to be purchased from the system, the power conditioning system (PCS), in charge of charging and discharging, of the energy storage apparatus (ESS) may make an adjustment through charging and discharging control in such a manner that electricity is received (purchased) during a low-load time span (that is, during a time span with a low electricity billing rate).

In recent years, there has been a growing demand for new renewable energy. This demand stems from requirements mandating the installation of photovoltaics facilities or the like when constructing new houses. Many companies are in preparation to launch home energy storage systems (ESS) that operate in conjunction with a solar panel.

In a case where the home ESS is utilized in a house where the photovoltaics (PV) facilities are installed, foreign material (dust, bird poop, snow, or fallen leaves) or stains due to snow or rain may accumulate on the surface of the solar panel. This accumulation can block exposure to sunlight, thereby reducing the efficiency of sunlight generation.

Accordingly, a shortage of electricity generation in the ESS leads to an increase in the purchasing amount of electric power, resulting in higher electric charges for a house that utilizes the ESS. Moreover, there is a possibility of a failure occurring within a solar panel component itself.

SUMMARY

Therefore, to obviate those problems, one aspect of the detailed description is to provide an energy management apparatus and an energy management method that are capable of detecting an abnormality of a solar panel in an optimized manner.

Another aspect of the detailed description is to provide an energy management apparatus and an energy management method that are capable of providing a user alarm service and a service for association with a repair company in an optimized manner when an abnormality occurs to a solar panel.

To achieve these and other advantages and in accordance with the purpose of the present disclosure, as embodied and broadly described herein, there is provided an energy management apparatus including: an electricity generation amount forecast unit including an electricity generation amount forecast model; a consumption amount forecast unit including a consumption amount forecast model; and a control module configured to detect an abnormality of a solar panel based on a forecast electricity generation amount, which is forecasted on a per-time span basis, and on an actually generated electricity generation amount, wherein the control module corrects the forecast electricity generation amount based on the electricity generation amounts up to now and determines the presence or absence of the abnormality of the solar panel and the cause of a failure of the solar panel based on the corrected forecast electricity generation amount.

In the energy management apparatus, the control module may correct the forecast electricity generation amount based on the electricity generation amounts up to now, in a case where the abnormality of the solar panel is detected, and the control module may control battery charging and discharging in different modes according to types of the abnormality of the solar panel, using the corrected forecast electricity generation amount and the time span-based forecast consumption amount forecasted by the consumption amount forecast model.

In the energy management apparatus, the control module may control the battery charging and discharging in a first mode in a case where the abnormality of the solar panel is a first type panel abnormality, and the control module may control the battery charging and discharging in a second mode, different from the first mode, in a case where the abnormality of the solar panel is a second type panel abnormality, different from the first type panel abnormality.

In the energy management apparatus, the control module may primarily determine the presence or absence of the abnormality of the solar panel based on the forecast electricity generation amount, which is forecasted on a per-time span basis, and on the actually generated electricity generation amount, the control module may correct the forecast electricity generation amount based on the electricity generation amounts up to now in a case where the abnormality of the solar panel is determined to be present, and the control module may secondarily determine the presence or absence of the abnormality of the solar panel and the cause of the failure of the solar panel based on the corrected forecast electricity generation amount and the actually generated electricity generation amount.

In the energy management apparatus, the control module may determine the presence or absence of the abnormality of the solar panel and the cause of the failure of the solar panel, using at least one of the following: weather information and equipment information of the energy management apparatus, in addition to the forecast electricity generation amount and the actually generated electricity generation amount.

In the energy management apparatus, the equipment information of the energy management apparatus may include at least one of the following: grid information, photovoltaics (PV) information, power conversion system (PCS) information, and battery information.

In the energy management apparatus, when determining the cause of the failure of the solar panel, the control module may determine the cause of the failure as any one of the following: covering on the solar panel and the failure of the solar panel itself.

In the energy management apparatus, the control module may estimate the root cause of the covering on the solar panel through a threshold value for abnormality detection.

In the energy management apparatus, the threshold value for abnormality detection may vary according to the size or capacity of the solar panel.

In the energy management apparatus, the control module may determine the failure of the solar panel as the failure of the solar panel itself based on equipment information of the energy management apparatus.

In the energy management apparatus, when the presence or absence of the abnormality of the solar panel and the cause of the failure of the solar panel are determined, the control module may transmit the result of the determination to a previously connected user terminal.

In the energy management apparatus, when the presence or absence of the abnormality of the solar panel and the cause of the failure of the solar panel are determined, the control module may provide information on a service provider, which is preset according to a type of the cause of the failure, to a previously connected user terminal.

According to the present description, the presence or absence of an abnormality of a solar panel is determined based on an electricity generation amount, and a forecast electricity generation is corrected. Then, the presence or absence of the abnormality of the solar panel and the cause of a failure of the solar panel are secondarily determined. As a result, in a more precise manner, the presence or absence of the abnormality of the solar panel can be diagnosed, and the cause of the failure can be identified.

According to the present disclosure, services for an application-based user alarm and for service association are provided. Thus, an alarm for removing the cause of the abnormality can be provided, and a service for automatic association with an after-sale service for the solar panel and a panel cleaning service can be provided.

DETAILED DESCRIPTION OF THE EMBODIMENTS

Figure 1:
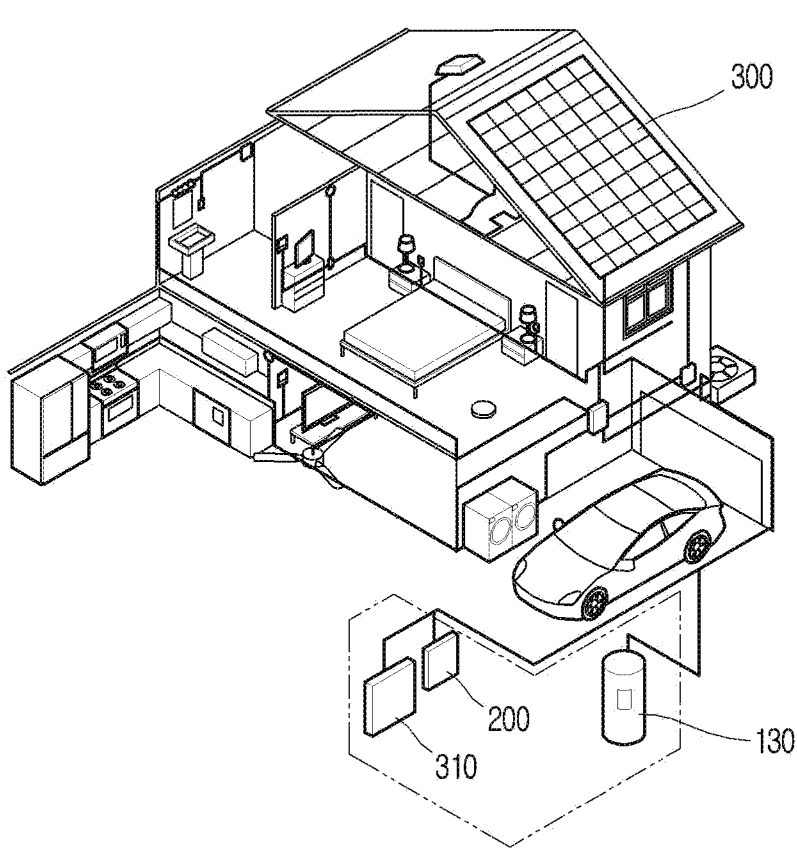
FIG. 1 is a conceptual diagram for describing one example that is referenced to describe a house in which an ESS according to a first embodiment of the present disclosure is installed.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Display devices presented herein may be implemented using a variety of different types of devices. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, watch-type terminals, (smart watches), glass-type terminals (smart glasses), head mounted displays (HMDs)), and the like.

By way of non-limiting example only, further description will be made with reference to particular types of display devices. However, such teachings apply equally to other types of display devices, such as those types noted above. In addition, these teachings may also be applied to stationary robots such as digital TVs, desktop computers, digital signages, and the like.

FIG. 1 is a conceptual diagram for describing one example that is referenced to describe a house in which an ESS 200 according to a first embodiment of the present disclosure is installed.

As illustrated in FIG. 1, the house in which an energy management apparatus is installed may include a solar panel 300, a battery 310, the ESS 200, and a control module 130.

The solar panel 300 refers to a panel in use for converting solar energy into electric power. Electric power generated in the solar panel 300 may be stored in at least one of the battery 310 and the ESS 200.

The electric power generated in the solar panel 300 is stored in the battery 310. The battery 300 serves to supply electric energy (electric power) to appliances within the house that require electric energy.

The ESS 200 may control the solar panel 300, the battery 310, and various smart equipment included within the house in such a manner that new renewable energy, such as solar light and wind power, which is difficult to use to produce electric power at desired times, is stored and used when necessary.

For the purpose of control, the ESS 200 may find application in the electricity generation field for generating electricity, the transmission and distribution field for transmitting the generated electricity, and the electricity user household (customer) field for actually consuming the distributed electricity.

The control module 130 may control various equipment, such as the solar panel 300, the battery 310, the ESS 200, and smart equipment within the house, which are described above.

In addition, the control module 130 may detect an abnormality of the solar panel 300, determine the cause of a failure of the solar panel 300, and provide a user with an alarm service and information on a service provider capable of addressing the failure.

Figure 2:
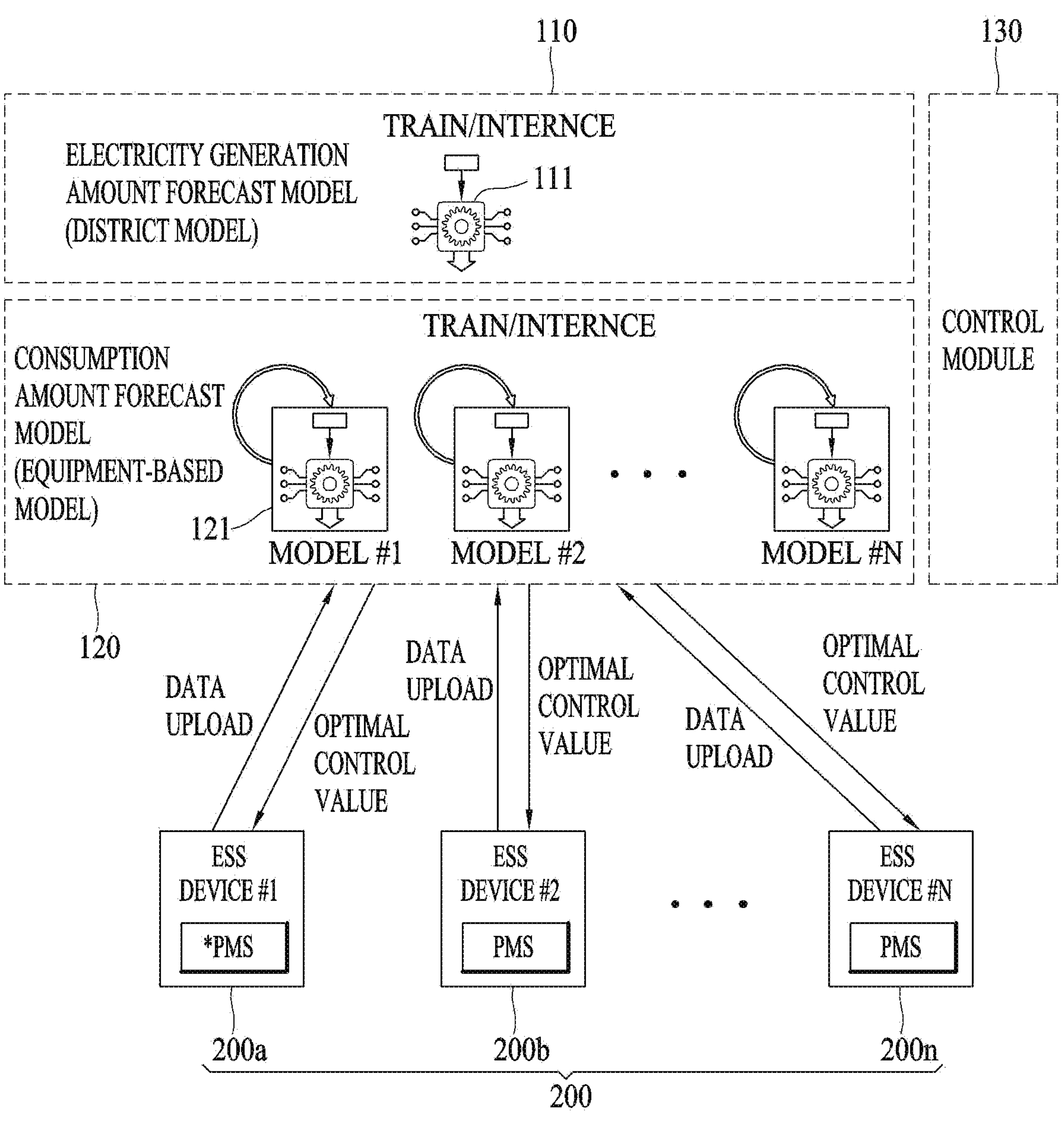
FIG. 2 is a block diagram that is referenced to describe an energy management apparatus according to the first embodiment of the present disclosure.

FIG. 2 is a block diagram that is referenced to describe the energy management apparatus according to the first embodiment of the present disclosure.

The energy management apparatus according to the present disclosure may also be a server that manages energy on a per-country/region basis and be an apparatus that manages energy on a per-district/building/house basis.

The energy management apparatus may forecast an electricity generation amount, which can be generated in an apparatus (for example, a solar panel or the like) capable of generating energy in an entity under control (a country, region, district, building, house, or the like), and a consumption amount, which is consumed in the entity under control, and may receive as much electric power as insufficient, in advance from a system during a low load time span.

At this point, the energy management apparatus according to the present disclosure may also perform forecast on a per-one-hour basis, taking into consideration the efficiency of energy to be produced, and may also determine an electric power amount to be received, taking into consideration the remaining storage space in the battery (or the energy storage apparatus).

In addition, the energy management apparatus according to the present disclosure may forecast (compute) more precisely an insufficient amount by correcting estimated values of the electricity generation amount and the consumption amount before a price-increasing point in time (or an up-riser) in a time of use (TOU) rate.

For this purpose, the energy management apparatus according to the present disclosure, as illustrated in FIG. 1, includes an electricity generation amount forecast unit 110, a consumption amount forecast unit 120, and the control module 130. The electricity generation amount forecast unit 110 includes an electricity generation amount forecast model 111. The consumption amount forecast unit 120 includes a consumption amount forecast model 121. The control module 130 adjusts an electric power purchase point in time and an electric power amount on a per-time span basis, based on a forecast electricity generation amount, which is output from the electricity generation amount forecast model 111, and on a forecast consumption amount, which is outputted from the consumption amount forecast model 121.

The electricity generation amount forecast model 111 and the consumption amount forecast model 121 may be artificial intelligence models that are trained through machine learning.

Artificial intelligence refers to a field that involves methods of performing tasks that typically require human intelligence. Machine learning refers to a field that involves methods of defining and addressing various problems arising in the artificial intelligence field. Machine learning is also defined as algorithms for increasing performance on given tasks over time by learning from experience with the given tasks.

An artificial neural network (ANN) is a model that is used in the machine learning. As such, the ANN may refer to all models that consist of artificial neurons (nodes) interconnected through synapses to form a network and have problem-solving capabilities. The ANN may be defined by connection patterns between neurons in different layers, learning processes of updating model parameters, and activation functions of generating output values.

The ANN may include an input layer, an output layer, and, selectively, one or more hidden layers. Each layer may include one or more neurons. The ANN may include synapses interconnecting these neurons. In the ANN, each neuron may output input signals, which are input through the synapses, a weighted value, and a function value of the activation function with respect to a bias.

A model parameter refers to a parameter that is determined through learning, and includes a weighted value of a synapse connection, a neuron bias, and similar factors. A hyperparameter refers to a parameter required to be set before learning in a machine learning algorithm and includes a learning rate, the number of times of repetition, a mini-batch size, an initialization function, and similar factors.

A learning objective of the ANN is to determine a model parameter for minimizing a loss function. The loss function may be used as an index for determining an optimal model parameter in the learning process of the ANN.

The machine learning may be categorized by a learning technique into the following types: supervised learning, unsupervised learning, and reinforcement learning.

The supervised learning may refer to a method used to train the ANN in a state where a label for learning data is given. The label may refer to a correct answer (or a result value) that the ANN is required to infer in a case where the learning data is input into the ANN. The unsupervised learning may refer to a method used to train the ANN in a state where the label for learning data is not given. The reinforcement learning may refer to a training method used to train an agent, defined under a given environment, to select actions or a sequence of actions, which maximize accumulation rewards in each state.

The machine learning, realized using a deep neural network (DNN) consisting of a plurality of hidden layers, among intelligent neural networks, is also referred to as deep learning, and the deep learning is part of the machine learning. The machine learning is hereinafter referred to as deep learning.

The electricity generation amount forecast model 111 and the consumption amount forecast model 121 may be among several types of neural networks described above.

As one example, the electricity generation amount forecast model 111 and the consumption amount forecast model 121 may output (compute or determine) a time span-based forecast electricity generation amount and a time span-based forecast consumption amount through the supervised learning.

For this purpose, the electricity generation amount forecast model 111 may output as an output value the time span-based forecast electricity generation amount, using as an input value at least one of the following factors: past electricity generation amounts, weather conditions, and energy electricity generation information.

As illustrated in FIG. 2, the electricity generation amount forecast model 111 may forecast the electricity generation amount for a target under control (for example, on a per-region basis).

In addition, the consumption amount forecast model 121 may output, as an output value, the time span-based forecast consumption amount, using, as an input value, at least one of the following factors: past consumption amounts, weather conditions, holiday information, and an appliance consumption amount.

The consumption amount forecast model 121 may have a smaller unit for control to forecast the consumption amount subdivided on a per-household basis or on a per-equipment basis than the electricity generation amount forecast model 111.

Subsequently, the control module 130 may adjust (or determine) the electric power purchase point in time and the electric power amount on a per-time span basis, based on the forecast electricity generation amount, which is output from the electricity generation amount forecast model 111, and on the forecast consumption amount, which is outputted from the consumption amount forecast model 121.

The control module 130 may transmit and receive data through communication with a power management system (PMS) of the energy storage apparatus (the ESS). The control module 130 may receive information on an electric power amount stored in the energy storage apparatus, and on a space, available for storage, in the energy storage apparatus.

In addition, the control module 130 may perform overall control for energy charging/discharging of the energy storage apparatus.

Figure 3:
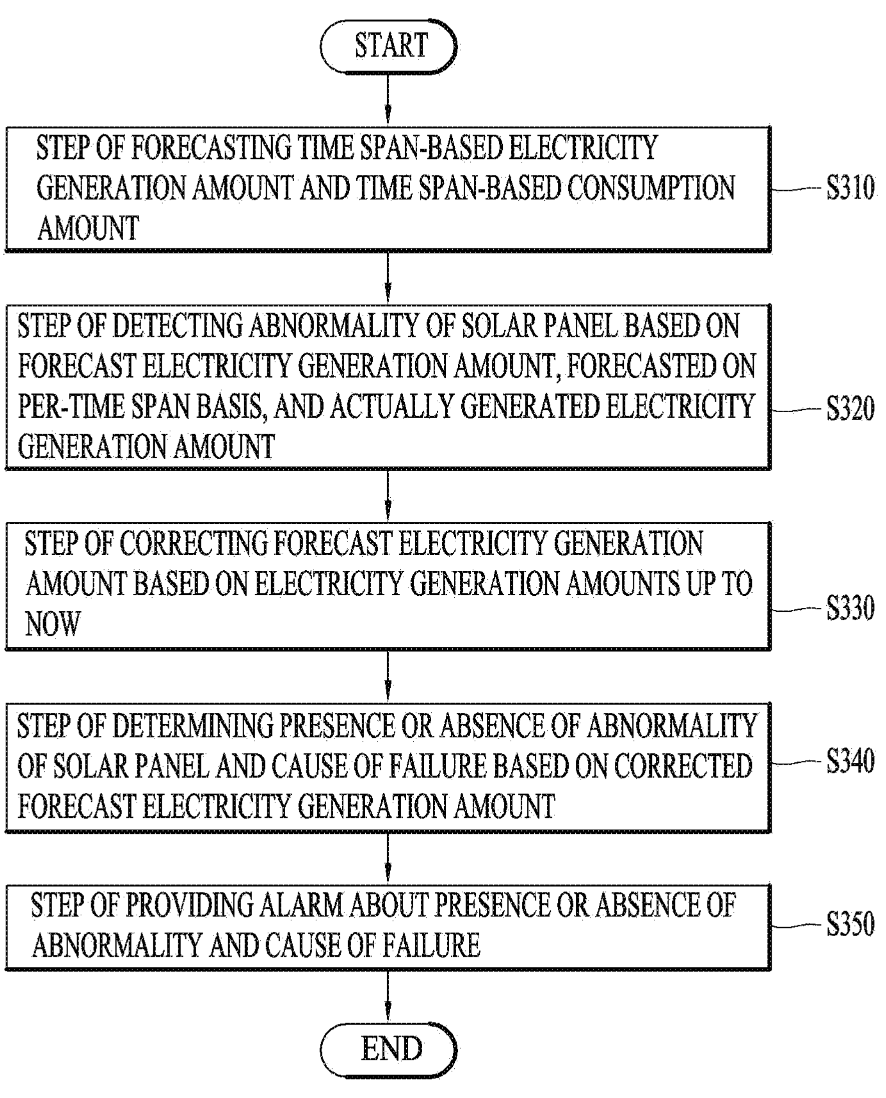
FIG. 3 is a flowchart that is referenced to describe an energy management method according to a second embodiment of the present disclosure.

FIG. 3 is a flowchart that is referenced to describe an energy management method according to a second embodiment of the present disclosure. FIGS. 4, 5, 6, 7, and 8 are conceptual diagrams that are reference to describe the energy management method illustrated in FIG. 3.

The energy management method according to the present disclosure may be performed under the control of the energy management apparatus.

With reference to FIG. 3, in the energy management method, a step of forecasting a time span-based electricity generation amount and a time span-based consumption amount is performed (S310).

As illustrated in FIG. 3, the electricity generation amount forecast model 111 may output, as an output value, a time span-based forecast electricity generation amount, which can be generated on a per-time span basis, using, as input values, past electricity generation amounts, weather conditions (temperature, humidity, an amount of cloud, and the like), and energy electricity generation information (for example, solar light panel information and the like).

In addition, the consumption amount forecast model 121 may output, as an output value, a time span-based forecast consumption amount, which is consumed on a per-time span basis, using, as input values, past consumption amounts, weather conditions (temperature, humidity, and the like), weekday and weekend holiday information, the possession or non-possession of an electric vehicle, and an appliance consumption amount.

The control module 130 may compute an electric power amount, which is necessary on a per-time span basis, based on the forecasted electricity generation amount and the forecasted consumption amount.

In a method used in the related art, during a time span when an electricity tariff is low, the energy storage apparatus is charged with electric power that is unconditionally received at maximum capacity or at a predetermined amount or larger. Additionally, during a time span when electric power is insufficient, the electric power stored in the energy storage apparatus is used.

Accordingly, a case occurs where unnecessary electric power is received, and a space is unavailable for storing electric power generated during a time span when an electricity generation amount is larger than a consumption amount. Consequently, this situation leads to the problem of unnecessary electricity generation.

However, the energy management apparatus according to the present disclosure may forecast the electricity generation amount and the consumption amount on a per-time span basis, using the electricity generation amount forecast model 111 and the consumption amount forecast model 121 that are trained through the machine learning, may receive as much electric power as necessary from the system, and may store the received electric power in the energy storage apparatus.

For this purpose, the control module 130 may compute a necessary electric power amount expected to be in shortfall by computing the forecast electricity generation amount and the forecast consumption amount on a per-time span basis.

The control module 130 may detect the abnormality of the solar panel 300 based on the forecast electricity generation amount, which is forecasted on a per-time span basis, and the actually generated electricity generation amount (S320).

For example, in a case where the actually generated electricity generation amount falls short of the forecast electricity generation amount, which is forecasted during a certain time span, the control module 130 may determine that an abnormality occurs to the solar panel 300.

Figure 4:
FIGS. 4, 5, 6, 7, and 8 are conceptual diagrams that are reference to describe the energy management method illustrated in FIG. 3.
Figure 4:
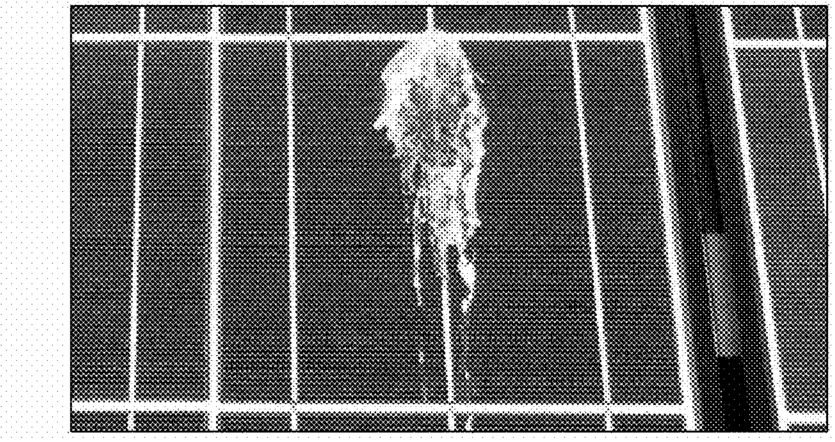
Figure 4:

A proper electricity generation amount cannot be obtained in a case where dust accumulates up on the solar panel 300 as illustrated in (a) of FIG. 4, in a case where the solar panel 300 is stained with foreign material as illustrated in (b) of FIG. 4, or in a case where outside material, such as a coating of snow, that obstructs solar light from being incident on the solar panel 300 is present on the solar panel 300 as illustrated in (c) of FIG. 4.

In this case, the control module 130 may correct the forecast electricity generation amount based on the electricity generation amounts up to now (S330).

Figure 7:
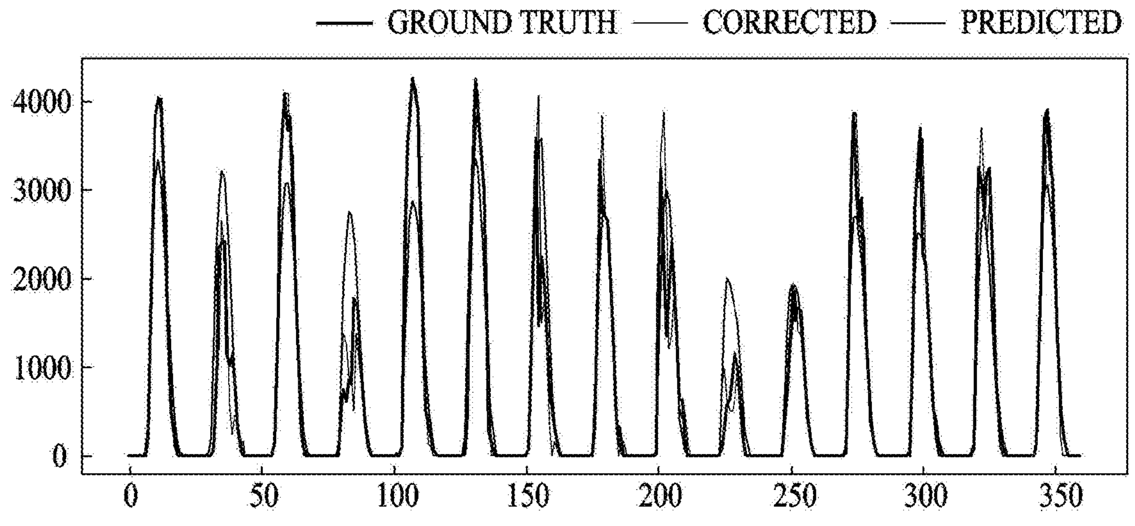

Specifically, the control module 130, as illustrated in FIG. 7, may correct the forecast electricity generation amount based on a difference in value between the forecasted forecast electricity generation amount and the actually generated electricity generation amount.

The correction of the forecast electricity generation amount may be performed by the control module 130 based on Mathematical Equation 1 that follows.

$$x_{corrected} = \hat{x} + \gamma \frac{1}{T} \sum_{i=1}^{T} (x_i - \hat{x}_i) \quad \text{[Mathematical Equation 1]}$$

where $x_i$ denotes an observed electricity generation amount at point in time i, $\hat{x}$ denotes a forecast electricity generation amount, and $\gamma$ denotes a weighted value (ranging from 0 to 1).

When the presence or absence of the abnormality of the solar panel 300 is determined based on a forecast electricity generation amount, the precision of the determination is low. For this reason, when the abnormality is detected, the forecast electricity generation amount is corrected based on an actual electricity generation amount, and the presence or absence of the abnormality of the solar panel 300 is redetermined based on the corrected forecast electricity generation amount.

Subsequently, based on the corrected forecast electricity generation amount, the control module 130 may determine the presence or absence of the abnormality of the solar panel 300 and the cause of the failure of the solar panel 300 (S340).

Subsequently, the control module 130 may provide a previously connected user terminal (or mobile terminal) with an alarm about the presence or absence of the abnormality of the solar panel 300 and the cause of the failure of the solar panel 300.

Figure 5:
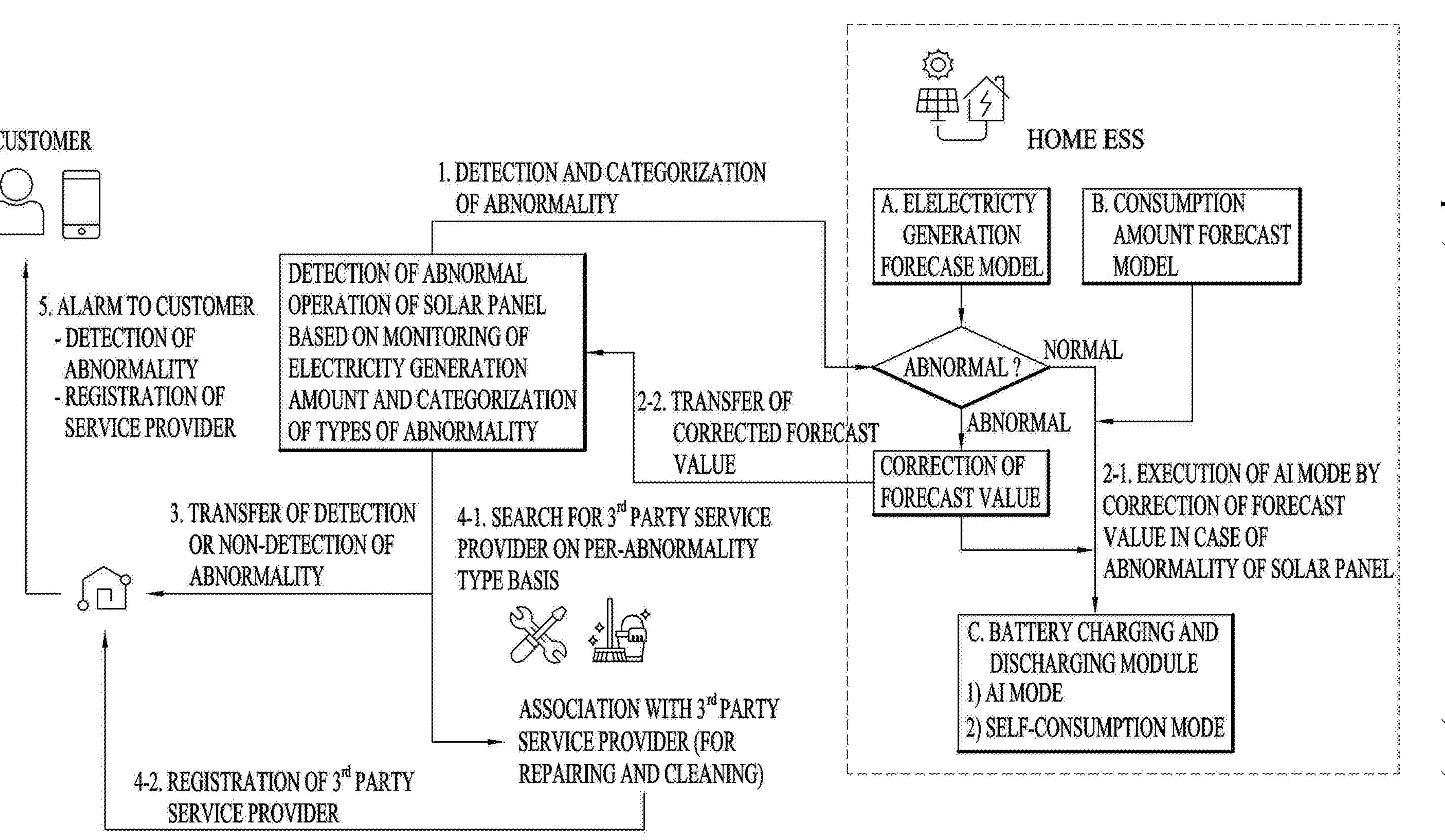

With reference to FIG. 5, the energy management apparatus may detect the abnormality of the solar panel 300 based on the forecast electricity generation amount, which is forecasted through the electricity generation amount forecast model 111 and on the actually generated electricity generation amount.

At this point, the control module 130 may correct the forecast electricity generation amount based on the electricity generation amounts up to now in a case where the abnormality of the solar panel 300 is detected and may control battery charging and discharging in different modes according to types of the abnormality of the solar panel 300, using the corrected forecast electricity generation amount and the time span-based forecast consumption amount that is forecasted by the consumption amount forecast model 121 (2-1).

Specifically, the control module 130 may control the battery charging and discharging in a first mode in a case where the abnormality of the solar panel 300 is a first type panel abnormality, and may control the battery charging and discharging in a second mode, different from the first mode, in a case where the abnormality of the solar panel 300 is a second type panel abnormality, different from the first type panel abnormality (C).

At this point, as one example, the control module 130 may include a battery charging and discharging control module.

With the corrected forecast electricity generation amount, the control module 130 may determine whether the abnormality of the solar panel 300 is the first type panel abnormality (for example, covering on the solar panel 300) or the second type panel abnormality (for example, the failure of the solar panel 300 itself).

The control module 130 may enter the first mode (for example, an artificial intelligence (AI) mode) and perform energy control in a case where the abnormality of the solar panel 300 is determined to be the first type panel abnormality (for example, the covering on the solar panel 300).

The first mode may refer to a mode, trained through a deep learning algorithm, that, when generating low electric power, performs control according to a method of supplying electric power to smart equipment in a house and a method of controlling the smart equipment to minimize electric power consumption by the smart equipment.

The control module 130 may enter the second mode (for example, a self-consumption mode) and perform energy control in a case where the abnormality of the solar panel 300 is determined to be the second type panel abnormality (for example, the failure of the solar panel 300 itself).

The second mode refers to a mode that controls the smart equipment provided in the house by utilizing the electric power prestored in the ESS. In this case, since the electric power stored in the ESS is used, the second mode refers to a mode that consumes outside electric power after the electric power stored in the ESS is all used up.

The control module 130 may primarily determine the presence or absence of the abnormality of the solar panel 300 based on the forecast electricity generation amount, which is forecasted on a per-time span basis, and on the actually generated electricity generation amount (1). In a case where the abnormality of the solar panel 300 is determined to be present, the control module 130 corrects the forecast electricity generation amount based on the electricity generation amounts up to now (2-2). The control module 130 may secondarily determine the presence or absence of the abnormality of the solar panel 300 and the cause of the failure of the solar panel 300 based on the corrected forecast electricity generation amount and the actually generated electricity generation amount.

The cause of the failure may be broadly categorized into panel covering on the solar panel 300 and a failure of a photovoltaics (PV) panel itself.

A phenomenon of the covering on the solar panel 300 may be divided into various steps according to whether or not an error between the forecast electricity generation amount ($\hat{x}$), which was forecasted one day ago, and the actual electricity generation amount (x) is at a threshold value (ε) or the like. The phenomenon of the covering on the solar panel 300 may be determined based on cases where an abnormality occurs.

The control module 130 may determine whether the solar panel 300 is partially or wholly covered due to foreign material or the like. This determination utilizes a forecast model that was normally trained 24 to 48 hours ago for extraction of the forecast electricity generation amount based on data such as weather forecasts and sunshine levels. This determination is performed in conjunction with equipment information of the ESS (grid information, photovoltaics (PV) information, power conversion system (PCS) information, and battery information).

Specifically, the control module 130 may determine the presence or absence of the solar panel 300 and the cause of the failure of the solar panel 300, using at least one of the following: weather information and equipment information of the energy management apparatus (the equipment information of the ESS), in addition to the forecast electricity generation amount and the actually generated electricity generation.

The equipment information of the energy management apparatus may include at least one of the following: the grid information, the PV information, the PCS information, and the battery information.

The grid information may include information on voltage, electric current, frequency, electric power, a power factor, and the like.

The PV information may include information on voltage, electric current, frequency, electric power, a power factor, and the like.

The PCS information may include information on the following: an ID number, a state code, (active/reactive) electric power, (L1/L2 active/reactive/apparent/3-phase) electric power, a (charging/discharging/active/reactive/total active/total reactive) power factor, L1/L2 phase temperature, converter temperature, and the like.

The battery information may include information on the following: an ID number, a state code, electric power, maximum charging/residual capacity, voltage, charging/discharging electric power restriction, charging/discharging electric current restriction, a real/user SoC, unit electric current, cell average voltage, a BCS state (consisting of 21 error codes), a CB relay state (5 codes), cell information (maximum/minimum voltage/electric current, a cell position, and the like), connection terminal temperature, cooling pan electric current, and the like.

Figure 6:
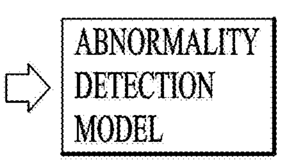

With reference to FIG. 6, the control module 130 may include an abnormality detection model and may categorize the normality and the abnormality of the solar panel 300 based on a forecast value of the electricity generation amount, the actual electricity generation amount, weather conditions, atmosphere quality, and the equipment information of the ESS. In a case where the solar panel 300 is determined to be abnormal, the control module 130 may categorize the detail of the abnormality (that is, the cause of the failure).

As described above, the detail of the abnormality may refer to the covering on the solar panel 300 by foreign material or the like on the solar panel 300 or the abnormality of the solar panel 300 itself.

When determining the cause of the failure of the solar panel 300, the control module 130 may determine the cause of the failure of the solar panel 300 as any one of the following: the covering on the solar panel 300 and the failure of the solar panel 300 itself.

The control module 130 may estimate the root cause of the covering on the solar panel 300 through a threshold value for abnormality detection.

The threshold value for abnormality detection may vary according to the size and capacity of the solar panel 300.

In addition, the control module 130 may determine the cause of the failure of the solar panel 300 as the failure of the solar panel 300 itself based on the equipment information of the energy management apparatus.

The control module 130 may divide the phenomenon of the covering on the solar panel 300 into various steps according to whether or not the error between the forecasted electricity generation amount ($\hat{x}$), which was forecasted one day ago and the actual electricity generation amount (x) is at the threshold value (ε) or the like and may determine the phenomenon of the covering on the solar panel 300 based on cases where an abnormality occurs.

$$\hat{x} - x > \epsilon_i \quad \text{[Mathematical Equation 2]}$$

The threshold value for abnormality detection may vary according to the size and capacity of the solar panel 300.

The control module 130 may estimate the root cause of the covering on the solar panel 300 by performing detailed categorization based on several threshold values.

For example, the control module 130 may perform detailed categorization into the following cases: a case where threshold value 1 (ε1) accounts for approximately 75% of the electricity generation amount when the whole solar panel 300 is utilized; a case where threshold value 2 (ε2) accounts for approximately 50% of the electricity generation amount when the whole solar panel 300 is utilized; a case where threshold value 3 (ε3) accounts for approximately 25% of the electricity generation amount when the whole solar panel 300 is utilized; and similar cases. The control module 130 may also determine types of the covering on the solar panel 300 according to each threshold value.

For example, the control module 130 may determine that the accumulation of the dust on the solar panel 300 causes the covering on the solar panel 300, in a case where a difference between the corrected forecast electricity generation amount and the actual electricity generation amount is at or below a threshold value of 1. Furthermore, the control module 130 may determine that foreign material (bird poop or fallen leaves) is present on the solar panel 300, in a case where the difference therebetween is at or below a threshold value of 2. Furthermore, the control module 130 may determine that material, such as snow, that does not transmit light accumulates on the solar panel 300, in a case where the difference therebetween is at or below a threshold value of 3.

In addition, the control module 130 may determine the failure of the solar panel 300 itself based on the equipment information of the energy management apparatus.

At this point, the control module 130 may determine the failure of the solar panel (the PV panel) 300 itself based on the equipment information of the energy management apparatus (or the equipment information of the ESS) (the grid information, the PV information, the PCS information, and the battery information). Furthermore, the control module 130 may improve forecast precision by excluding conditions, such as weather conditions and atmosphere quality, which cause the covering on the solar panel 300.

When the failure of the solar panel 300 itself or the abnormality of the solar panel 300 due to the covering on the solar panel 300 is detected, the energy management apparatus according to the present disclosure may accordingly provide a subsequent service.

For example, when the presence or absence of the abnormality of the solar panel 300 and the cause of the failure of the solar panel 300 are determined, the control module 130 may transmit the result of the determination to the previously connected user terminal.

At this point, the previously connected user terminal may refer to a user terminal that in advance establishes or in the past established a connection to the energy management apparatus to control the energy management apparatus, or that is preset to receive information.

When an abnormality in the electricity generation amount and the cause (root cause) of the failure are estimated, the control module 130 may provide an alarm to the user terminal of a customer who uses the ESS and may request identification of the abnormality and the cause, using an application (for example, a chatbot or a notification bar).

In addition, when the presence or absence of the abnormality of the solar panel 300 and the cause of the failure of the solar panel 300 are determined, the control module 130 may provide information on a service provider, which is preset according to a type of the cause of the failure, to the previously connected user terminal.

For example, when the cause of the abnormality in the electricity generation amount is identified through the user terminal (identification feedback, transmission of an image captured by a camera, and the like), the control module 130 may recommend (provide) a district service provider (for example, a cleaning service provider, an after-sale service provider, or the like) that is service-associated with remedying the cause of the abnormality, using the application.

In a case where the service association is set not to be desired or where direct resolving is set to be desired, the control module 130 may provide information on a panel management and on a method of resolving the abnormality to the user terminal.

Figure 8:
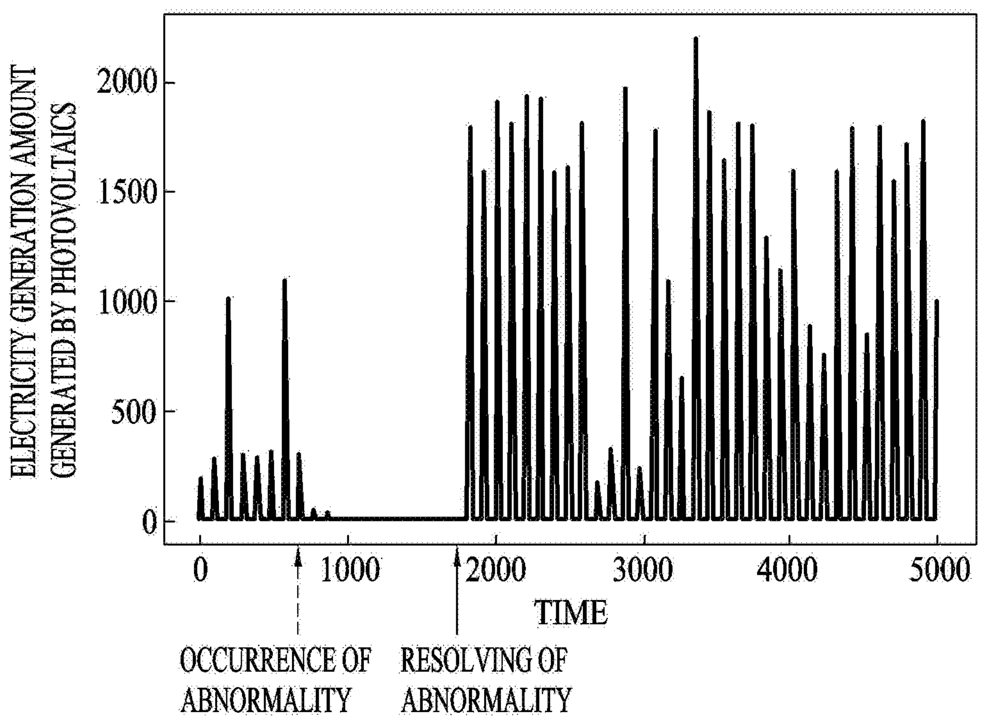

From FIG. 8, it can be seen that the electricity generation amount is remarkably reduced in a case where an abnormality occurs to the solar panel 300 and that the electricity generation amount is restored to its original state in a case where the abnormality is resolved.

In this manner, according to the present disclosure, the presence or absence of the abnormality of the solar panel 300 is determined based on the electricity generation amount, and the forecast electricity generation amount is corrected. Then, the presence or absence of the abnormality of the solar panel 300 and the cause of the failure of the solar panel 300 are secondarily determined. As a result, in a more precise manner, the presence or absence of the abnormality of the solar panel 300 can be diagnosed, and the cause of the failure of the solar panel 300 can be identified.

According to the present disclosure, services for an application-based user alarm and for service association are provided. Thus, an alarm for removing the cause of the abnormality can be provided, and a service for automatic association with an after-sale service for the solar panel 300 and a panel cleaning service can be provided.

So far, the preferred embodiment of the present disclosure has been illustrated and described, but the present disclosure is not limited to the specific embodiment, and many alternatives, modifications, and variations will be made by those skilled in the art without departing from the concept of the present disclosure and those variations should not be individually understood from the technical idea or forecast.

What is claimed is:

1. An energy management apparatus comprising:

an electricity generation amount forecast circuit that includes an electricity generation amount forecast model;

a consumption amount forecast circuit that includes a consumption amount forecast model configured to forecast a consumption amount on a per-time span basis; and a controller configured to detect an abnormality of a solar panel based on:

a forecast electricity generation amount, which is forecasted on a per-time span basis, and an actually generated electricity generation amount, wherein the controller:

determines a presence or absence of the abnormality of a solar panel based on the forecast electricity generation amount, which is forecasted on a per-time span basis, and on the actually generated electricity generation amount, corrects the forecast electricity generation amount based on the actually generated electricity generation amounts up to a current time in a case where the abnormality of the solar panel is determined to be present, and further determines the presence or absence of the abnormality of the solar panel and a cause of a failure of the solar panel based on the corrected forecast electricity generation amount and the actually generated electricity generation amounts.

2. The energy management apparatus of claim 1, wherein the controller corrects the forecast electricity generation amount based on the electricity generation amounts up to the current time, in a case where the abnormality of the solar panel is detected, and wherein the controller controls battery charging and discharging in different modes according to types of the abnormality of the solar panel, using the corrected forecast electricity generation amount and a time span-based forecast consumption amount forecasted by the consumption amount forecast model.

3. The energy management apparatus of claim 2, wherein the controller controls the battery charging and discharging in a first mode in a case where the abnormality of the solar panel is a first type panel abnormality, and wherein the controller controls the battery charging and discharging in a second mode, different from the first mode, in a case where the abnormality of the solar panel is a second type panel abnormality, different from the first type panel abnormality.

4. The energy management apparatus of claim 1, wherein the controller determines the presence or absence of the abnormality of the solar panel and the cause of the failure of the solar panel, using at least one of the following: weather information or equipment information of the energy management apparatus, in addition to the forecast electricity generation amount and the actually generated electricity generation amount.

5. The energy management apparatus of claim 4, wherein the equipment information of the energy management apparatus includes at least one of the following: grid information, photovoltaics (PV) information, power conversion system (PCS) information, or battery information.

6. The energy management apparatus of claim 1, wherein, based on determining the cause of the failure of the solar panel, the controller determines the cause of the failure as any one of the following: covering on the solar panel or the failure of the solar panel itself.

7. The energy management apparatus of claim 6, wherein the controller estimates a root cause of the covering on the solar panel through a threshold value for abnormality detection.

8. The energy management apparatus of claim 7, wherein the threshold value for abnormality detection varies according to a size or a capacity of the solar panel.

9. The energy management apparatus of claim 6, wherein the controller determines the failure of the solar panel as the failure of the solar panel itself based on equipment information of the energy management apparatus.

10. The energy management apparatus of claim 1, wherein, based on the presence or absence of the abnormality of the solar panel and the cause of the failure of the solar panel are determined, the controller transmits a corresponding determination result to a previously connected user terminal.

11. The energy management apparatus of claim 1, wherein, based on the presence or absence of the abnormality of the solar panel and the cause of the failure of the solar panel are determined, the controller provides information on a service provider, which is preset according to a type of the cause of the failure, to a previously connected user terminal.

* * * * *